No. 816,720. PATENTED APR. 3, 1906.
W. B. FENN.
CLOSURE DEVICE FOR BOTTLES, JARS, AND OTHER VESSELS.
APPLICATION FILED JUNE 19, 1905.
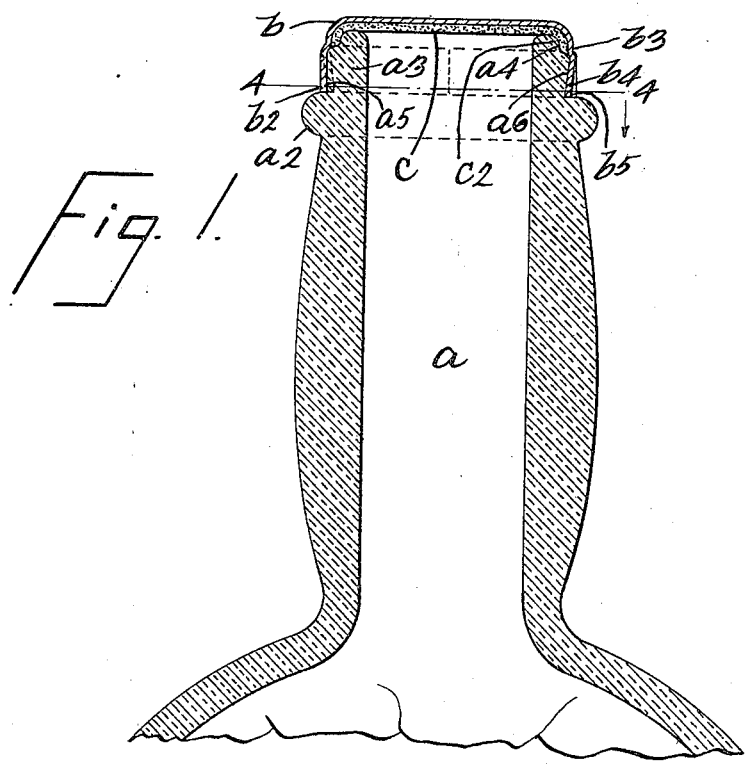
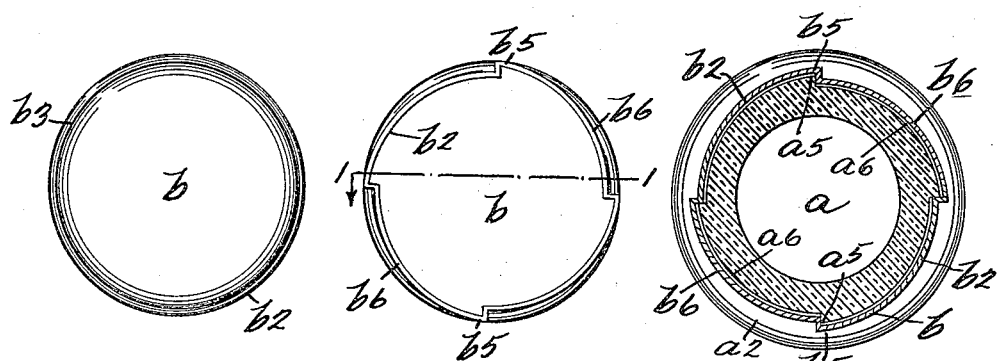
WITNESSES
INVENTOR
William B. Fenn
BY
Edgar Tate & Co
ATTORNEYS

UNITED STATES PATENT OFFICE.

WILLIAM B. FENN, OF SHEEPSHEAD BAY, NEW YORK.

CLOSURE DEVICE FOR BOTTLES, JARS, AND OTHER VESSELS.

No. 816,720.  Specification of Letters Patent.  Patented April 3, 1906.

Application filed June 19, 1905. Serial No. 265,946.

*To all whom it may concern:*

Be it known that I, WILLIAM B. FENN, a citizen of the United States, residing at Sheepshead Bay, in the county of Kings and State of New York, have invented certain new and useful Improvements in Closure Devices for Bottles, Jars, and other Vessels, of which the following is a specification, such as will enable those skilled in the art to which it appertains to make and use the same.

This invention relates to closure devices for bottles, jars, jugs, cans, and similar vessels; and the object thereof is to provide an improved device of this class which is particularly designed for use in connection with beer-bottles, mineral-water bottles, and other bottles of this class and in connection with glass fruit jars or cans and other jars or cans of this class, but which may be used for closing many kinds of bottles, jugs, jars, and other vessels.

The invention is fully disclosed in the following specification, of which the accompanying drawings form a part, in which the separate parts of my improvement are designated by suitable reference characters in each of the views, and in which—

Figure 1 is a central vertical section of the neck portion of a bottle provided with my improved closure device; Fig. 2, a top plan view of a closure device, and Fig. 3 a bottom plan view thereof, and Fig. 4 a section on the line 4 4 of Fig. 1.

In the drawings forming part of this specification I have shown at $a$ the neck of an ordinary bottle of any kind or class, and the neck $a$ is preferably provided at the top thereof with an annular enlargement or bead $a^2$, above which the neck is projected to form a top member $a^3$, which is preferably about one-half inch or from three-eighths of an inch to one-half of an inch in vertical height, and around the top portion of the part $a^3$ of the neck is preferably formed an annular groove $a^4$, and the outer walls of the bottom part of the top portion $a^3$ of the neck below the annular groove $a^4$ is provided with a plurality of vertical teeth $a^5$, four of which are preferably employed, as shown in Fig. 4, and these teeth extend from the groove $a^4$ downwardly to the enlargement or bead $a^2$, and said teeth increase in horizontal thickness from the groove $a^4$ downwardly to the enlargement or bead $a^2$, and the outer wall of the part $a^3$, which extends from one of said teeth to the other, is curved and spiral in form, as shown at $a^6$, and these walls are inclined inwardly and downwardly, as clearly shown in full lines at one side of Fig. 1 and in dotted lines at the other side.

I also provide a cap $b$, preferably composed of metal, but which may be composed of any desired material and which is provided with a depending flange or rim $b^2$, the vertical depth of which is about equal to the vertical depth of the part $a^3$ of the neck $a$, and the top portion of the flange $b^2$ is preferably slightly contracted annularly, as shown at $b^3$, and the bottom portion $b^4$ of said flange $b^2$ below the contracted portion $b^3$ is provided with inwardly-directed vertical teeth $b^5$, which correspond with the vertical teeth $a^5$ on the top portion $a^2$ of the neck and which increase in horizontal thickness from the top thereof downwardly, and the teeth $b^5$ are formed by crimping or compressing the flange $b^2$ of the cap $b$ or that part of said flange below the annularly-contracted portion $b^3$, and the grooved walls $b^6$ of the flange $b^2$ of the cap $b$ between the teeth $b^5$ are curved or spiral in form and are contracted inwardly and downwardly to correspond with the shape of the walls $a^6$ of the part $a^3$ of the neck $a$ between the teeth $a^5$, and the walls $a^6$ for the purpose of this description are called the "outer walls of the teeth $a^5$," while the walls $b^6$ for the purpose of this description are called the "outer walls of the teeth $b^5$," and these walls are both inwardly and downwardly contracted.

Within the top portion of the cap $b$ is placed a packing-disk $c$, preferably composed of fibrous material saturated with preservative material, such as paraffin or any other suitable liquid substance which would protect the packing-disk against the operation of liquids and acids; but the packing-disk $c$ may be composed of any suitable compressible material which can be protected by means of a solution of paraffin or other preservative material. The packing-disk $c$ is also provided with a depending flange or rim $c^2$, which fits in the annular groove $a^4$ in the top portion $a^3$ of the neck $a$ when said cap $b$ is secured in position.

In securing the cap $b$ in position the said cap is held so that the rim $b^2$ of the cap will pass downwardly over the part $a^3$ of the neck, in which position the teeth $b^5$ of the rim pass downwardly in front of the teeth $a^5$ of the neck, and the cap $b$ is then turned to the right. This operation of turning the cap $b$ to the right securely locks said cap on the part $a^3$ of the neck and also draws the cap downwardly and compresses it firmly on the packing-disk $c$ and on the flange or rim $c^2$ thereof and forces said flange or rim into close contact with the top portion $a^3$ of the neck, and this makes a perfectly secure and tight closure device. In opening the vessel all that is necessary is to turn the cap $b$ to the left.

As hereinbefore stated, the curved walls $a^6$ of the neck of the bottle and the curved walls $b^6$ of the flange or rim $b^2$ of the cap $b$ are inwardly inclined, the object of this being to securely lock the cap in position when said cap is turned to the right and also to draw said cap downwardly onto the packing-disk $c$, and although I have shown four of the teeth $a^5$ and $b^5$ it will be apparent that a different number of said teeth may be employed; but I prefer the number herein shown and described. The cap $b$ may also be made of glass or other earthenware, if desired; but as a general rule I prefer the metal cap, and said cap is also when made of metal preferably made thin enough to give the flange or rim $b^2$ an elasticity, which facilitates the operation of screwing the cap into position and unscrewing it when desired.

Having fully described my invention, what I claim as new, and desire to secure by Letters Patent, is—

1. The herein-described means for closing a bottle, jar or other vessel; comprising a cap having a depending flange or rim provided with vertically-arranged teeth which decrease in transverse thickness from the bottom thereof upwardly, the parts of said flange or rim between said teeth being spiral in form and being contracted or drawn inwardly from one of said teeth to the other, the bottle or vessel being also provided at the opening thereinto with an annular portion having vertically-arranged teeth which correspond with those on the flange or rim of the cap or disk and which increase in transverse thickness from the bottom thereof upwardly, and the walls of said annular portion between said teeth being spiral in form and inwardly and downwardly contracted, substantially as shown and described.

2. A bottle or other vessel provided with an opening around which is an annular portion having vertically-arranged teeth between which the parts of the annular portion are spiral in form and inwardly and downwardly contracted, and a cap having a depending flange or rim provided with vertically-arranged teeth between which the parts of the flange or rim are spiral in form and inwardly and downwardly contracted, substantially as shown and described.

3. A bottle or other vessel provided with an opening around which is an annular portion having vertically-arranged teeth between which the parts of the annular portion are spiral in form and inwardly and downwardly contracted, and a cap having a depending flange or rim provided with vertically-arranged teeth between which the parts of the flange or rim are spiral in form and inwardly and downwardly contracted, and a packing-disk placed in said cap and composed of compressible material saturated with a preservative material, substantially as shown and described.

4. A bottle, jar or similar vessel provided with a neck in the outer top portion of which is an annular groove below which is an annular portion provided with vertically-arranged teeth between which said annular portion is spiral in form and inwardly and downwardly contracted, and a cap provided with a depending flange or rim having vertically-arranged teeth between which the flange or rim is spiral in form and inwardly and downwardly contracted, said cap being also provided with a packing-disk, the perimeter of which fits in said annular groove, substantially as shown and described.

5. The herein-described closure device for bottles, jars and other vessels, comprising a cap having a depending flange or rim provided with vertically-arranged teeth between which the flange or rim is spiral in form and inwardly and downwardly contracted, substantially as shown and described.

6. The herein-described closure device for bottles, jars and other vessels, comprising a cap having a depending flange or rim provided with vertically-arranged teeth between which the flange or rim is spiral in form and inwardly and downwardly contracted, and a packing-disk placed in said cap, substantially as shown and described.

7. The herein-described closure device for bottles, jars and other vessels, comprising a cap having a depending flange or rim provided with vertically-arranged teeth between which the flange or rim is spiral in form and inwardly and downwardly contracted, and a packing-disk placed in said cap, said packing-disk being composed of fibrous material saturated with preservative material, substantially as shown and described.

In testimony that I claim the foregoing as my invention I have signed my name, in presence of the subscribing witnesses, this 15th day of June, 1905.

WILLIAM B. FENN.

Witnesses:
B. FENTON TINKHAM,
ADAM GSCHWINDT.